May 14, 1935. T. J. FOSTER 2,001,605
BUILDING CONSTRUCTION
Filed Feb. 23, 1932
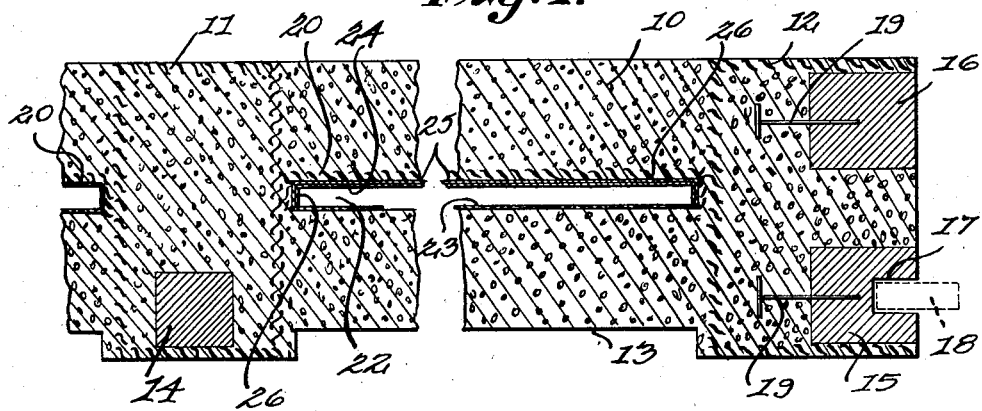
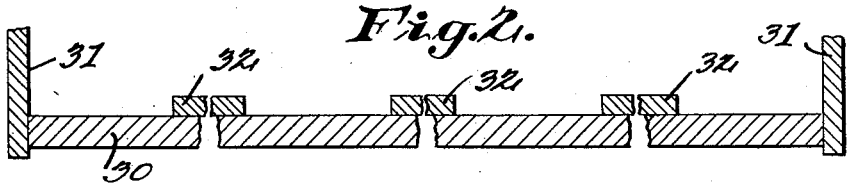
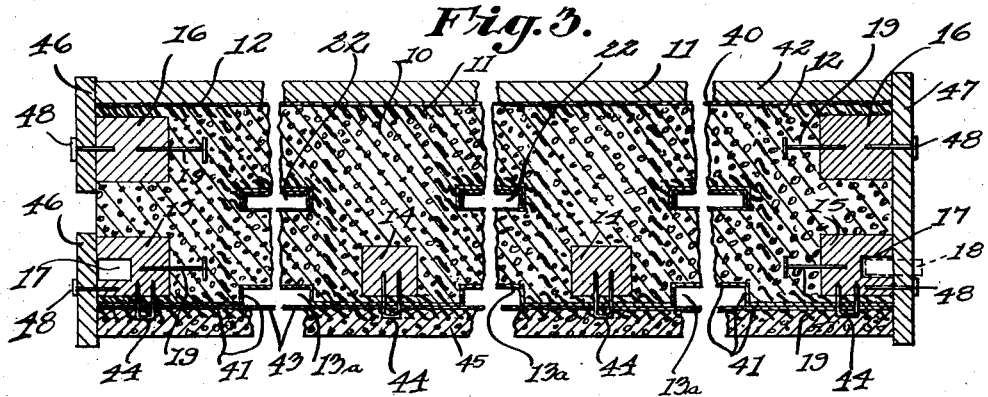
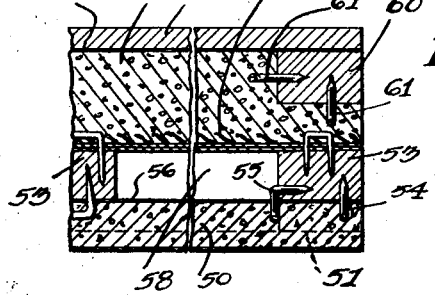
Inventor
Thomas J. Foster
By
Emery, Booth, Varney & Holcombe
Attorneys Patented May 14, 1935

2,001,605

UNITED STATES PATENT OFFICE 2,001,605

BUILDING CONSTRUCTION

Thomas J. Foster, Ridgewood, N. J.

Application February 23, 1932, Serial No. 594,723

16 Claims. (Cl. 72—16)

This invention relates to improvements in building construction and particularly aims to provide an improved light weight moisture, heat and sound proof building slab and an improved method of producing the same. The invention further aims to create from relatively weak materials, such as aerated gypsum, and relatively simple, easily formed reinforcing material, a slab in which these elements cooperate to produce in themselves a rigid self-sustaining structure, and in other respects to improve former slab structures comprising similar light weight heat and sound proof materials wherein rigid walls or frames were used to provide adequate strength.

Another object of my invention is to create a slab adapted for use in exterior walls composed principally of gypsum or other materials which as heretofore used have been incapable of resisting exposure to moisture and atmospheric conditions.

Further objects of the invention appear hereinafter in connection with the description of the preferred embodiments illustrated in the accompanying drawing, wherein Fig. 1 is a partial sectional view crosswise of the length of a slab body embodying my invention;

Fig. 2 is a sectional view illustrative of a form or mold suitable for use in preparing the slab body shown in Fig. 1;

Fig. 3 is a sectional view similar to Fig. 1 through a slab unit embodying my invention provided with unitary interior and exterior finished faces and supplied with protective strips rendering the same suitable for shipment; and Fig. 4 shows an inexpensive modified form of the invention.

Referring to Fig. 1 of the drawing, the slab structure therein shown comprises a body of set plastic material 10 such as aerated cellular gypsum or the like embedding and reinforced by spaced reinforcing means, such as the longitudinal box-like reinforcing members 11 and 12, of expanded metal or other suitable metal mesh. In the preferred form shown, the body of set plastic material 10 is provided in at least one of its faces with reentrant portions 13, and the box-like reinforcing members 11 and 12 extend through substantially the thickness of the slab body (i. e. from one face to the other) in the sections of the slab body between the reentrant portions 13.

To facilitate the erection of the slabs to form a wall, and to facilitate the attachment of surface finishing materials thereto, I may provide the slab-body 10 with embedded anchoring means such as the nailing strips or blocks 14, 15, 16, which, as shown, are preferably located with metallic reinforcing means, such as portions of the reinforcing members 11 or 12, extending between their nailing faces and the face of the slab-body. This arrangement insures the distribution of any stress tending to pull out the anchoring means to a large area of the body by way of the interposed bonded-in reinforcement and prevents any substantial straining or breakage of the slab-body structure.

In the form indicated in Fig. 1, the anchoring means 14, which are located intermediate of the width of the slab, will ordinarily be used merely for the attachment of surface finish materials and trim or other superposed elements to the slab-body as hereinafter explained with reference to Fig. 3; and the anchoring means 15 and 16, situated in the longitudinal edges of the slab, serve these and other purposes also. For example, the anchoring means 15 and 16 may be used for the temporary fastening of protective strips to the edges of the slabs to protect the edges against breakage, as shown in Fig. 3 and explained hereinafter, and they may be used to facilitate alignment of the slabs during erection to form a wall. In Figs. 1 and 3, for example, there is shown a form of aligning means comprising tongue and groove elements 17—18 to secure the edges of adjacent slabs firmly in place while permitting any slight expansion and contraction caused by atmospheric conditions, shrinkage or settlement.

To insure firm bonding-in of the edge strips or blocks 15, 16, the edge-faces of which set flush with the edge of the slab-body 10, these members are preferably provided with block anchoring means such as staples or T-members 19 secured to the blocks and embedded in the plastic body 10.

In constructing slab-bodies of relatively weak light-weight hardening plastic material, such as aerated gypsum, I have found that it is possible to do away with the rigid framing heretofore thought necessary in this type of construction to provide rigidity and strength to the slabs, and in accordance with my invention, I locate and bond-in the reinforcing means of expanded metal, wire mesh or other reticulated metal suitable for the purpose, so that the resulting reinforced hardened plastic body, after it has set, itself provides the strength and rigidity of the slab. In this connection I find it desirable to employ, in addition to the longitudinal box-like reinforcements 11 and 12, additional intermediate, transversely extending bonded-in reinforcement, which aids in providing rigidity and strength by distributing any locally applied stresses over a larger area of the slab-body. In the form shown, this reinforcing means comprises a section 20 of metal mesh or the like, embedded in the slab-body 10 and extending substantially the entire distance between adjacent members of the reinforcing means 11 and 12.

In the preferred form of my invention, as indicated in the drawing, I provide, in addition to or in lieu of air spaces formed by the attachment of surface finishes over the reentrant sections 13, intermediate insulating air spaces 22, the walls of which are preferably treated or coated, as by the application of a layer of heavy, tarry, bituminous or asphaltic material 23, 24, to render them waterproof and additionally heat and sound insulating. In the form shown, the insulating material 23 (which I herein refer to generically as bituminous material as illustrating the qualities believed to be desirable without restricting the range of materials which may be employed within the scope of my invention) is flowed, spread, laid down or painted directly upon a continuous area of the poured body material 10, while the bituminous material 24 is carried by paper or like continuous backing 25 attached to reinforcing member 20 in any suitable manner. For simplicity in construction, and to coat substantially entirely all sides of the air space 22, I turn down the edges of the coated, continuously-backed metal mesh member 20—24—25, as indicated at 26, and this construction not only insulates substantially the entire surface of the air space, but also prevents the poured plastic material 10 (which is very fluid) from finding any substantial entrance thereto. In addition the turned down edges of the reinforcing mesh 20, lying closely adjacent to the mesh of the box-like reinforcing members 11, 12, as shown, and embedded therewith by the set plastic filling, connect and interrelate these reinforcing members so well that wiring or otherwise securing them together may be dispensed with, if desired.

The slab-body so far described may itself constitute a building unit and may be erected in the condition shown in Fig. 1, or this body may be coated wtih bituminous or other waterproofing, sound or heat insulating material or have attached to its faces sections of any desired interior or exterior surface finish material, or both waterproofing and surface finish may be applied, as hereinafter described.

The slab-body shown in Fig. 1 is a basic finished foundation unit of building construction capable of many adaptations to particular constructions without departing from my invention, and my invention contemplates that this subcombination may itself be employed as a complete precast foundation unit in building construction; and thereafter coated or finished in any appropriate manner if desired.

This pre-formed basic unit may be readily cast with the aid of the simple form shown in Fig. 2, which comprises a horizontal floor or bottom 30 having an area equal to the area of slab desired, and a surrounding wall 31 of a height at least equal to the thickness of slab to be cast therein. For forming reentrant sections in the first cast face of the slab-body 10, the form may be provided with any suitable molding strips, blocks or forms 32 of a shape corresponding to that of the reentrant section desired. These mold strips 32 may advantageously be removably attached to the form bottom 30, or merely laid in place therein, so that they may be replaced with similar forms of different size and spacing to adapt the same form bottom to the production of variously modified slab-bodies.

A simple method of making the slab of Fig. 1 by using the form illustrated, may be practiced by first placing the pre-shaped reinforcing means 11 and 12, with the enclosed blocks 14 and 15 in position in the spaces between the mold-blocks 32, and then pouring the grout-like aerated gypsum or other filling into the form to the level A—A, Fig. 1. A grout-like consistency of the filling material, such as is obtained with aerated gypsum, is preferable in the practice of my invention, to facilitate and expedite the bonding in of the reinforcing materials and the leveling of the filling at the line A—A, and it should be noted that this grouty filling passes freely into the interior of the box-like metal-mesh reinforcements 11 and 12 through the reticulated sides thereof.

The bituminous coating 23 may now be applied to the top of the cast filling extending between the reinforcing members 11 and 12, either by flowing it on or laying it down in sheet form, or, after sufficient setting of the filling 10, by painting the surface thereof with a brush, and after this has been done, the coated, continuously-backed, metal mesh 20, 24, 25, having its edges turned down, may be dropped into place to complete the insulating void. When this has been done the pouring of the light weight plastic filling may be completed and its upper surface may be screeded-off at the desired level, advantageously being finished even with the tops of the reinforcing members 11. The blocks 16, which are embedded during the completion of the pouring, may be inserted and held in place by any suitable pins, staples or other supporting means, with reference to the reinforcing 12 or the form walls 31, at any time prior to the completion of the fill.

As shown in Fig. 3, the resulting structure may be coated on its top surface, either before or after removal from the form in which it is built up, with one or more layers 40 of any suitable waterproofing, heat or sound proofing material or combination thereof; and after removal from the form the other face of the slab-body may be suitably coated in part or throughout its extent, as indicated at 41.

As is also clearly indicated in Fig. 3, the slab-body may have secured to it before erection, if this is desired, any interior surface finish 42, such as pulp-board, plaster-board, gypsum board, imitation stone, imitation wood, wood-veneer, "Lincrusta Walton", or other suitable coating or panelling, or in fact any desired finish, which may be cemented on or otherwise secured as by means of nails or tie members engaging the blocks 16.

Likewise the slab-body may have an exterior surface or surface foundation applied thereto in any desired manner. In the form shown in Fig. 3, such exterior surface comprises a foundation sheet 43 of continuously backed metal lath or other mesh, which may carry additional waterproofing, and which is readily secured to the anchor means 14, 15 as by staples 44, thus providing a foundation for the application of any cementitious exterior finish 45 such as a stucco finish, either as a part of the pre-formed slab, or after the pre-formed slab-body has been erected in place. A metal or other sheet-like finish may be secured in the same manner as the sheet 43.

As above mentioned, whether or not the preformed slab comprises exterior or interior surface finishes, it is desirable to attach protecting strips, as 46 or 47, to its edges to form a shipping unit, these strips covering at least the longitudinal edges of the slab and projecting laterally enough to protect them during transportation and storage. Light nails or brads 48 are preferably used to attach the temporary protecting means to the blocks 15, 16, so as to permit the removal of the protecting means when it has served its purpose. The block anchors 19 insure against breakage of the edges of the slab or loosening of the blocks 15, 16, in prying off, or otherwise removing, the protecting means.

As a rule it will be sufficient for shipping purposes to protect only the longitudinal edges of the slabs, which extend vertically when erected, because the other edges will usually be hidden in the finished wall by the floor and ceiling framing, soffits, or other structural parts; but if desired additional strips may be temporarily secured to the end edges, making a more substantial shipping unit. This may be desirable where considerable rough handling is anticipated, or where the slabs are unusually large or heavy, or repeated wetting or aging or other work is to be done on them prior to erection, or where the slabs must be carried to awkward locations for erection.

In the practice of my invention I prefer for most types of slab to cast a self-supporting foundation unit such as that shown in Fig. 1 and then apply desired finishes thereto, but my invention is not limited in this respect. For example, in Fig. 4 I have indicated a modified construction in which I first spread in a suitable form a thin layer 50 of external finishing material such as concrete, in which any suitable reinforcement, such as metal mesh, may be embedded as indicated by the dotted line 51. The exterior surface of this concrete layer may be finished in any desired way, as by actual or molded imitation trowelling to resemble trowelled stucco, by spreading crushed stone or pebbles in the slab-form to impart a pebbled or rough stone finish to the surface, or by laying stone or imitation brick veneer therein to be embraced in the poured cement or attached to the surface by the embedding of anchor members secured thereto. Before the hardening of this layer 50 anchor blocks 53, provided with staples or other anchor elements 54, 55 extending from their lower surfaces, may be pressed down into the position shown, the level of these members being determined as accurately as may be necessary by marks or pins on the form, or any suitable means. Preferably, as indicated at 56, the upper surface of the layer 50 is coated with a layer of bituminous material to waterproof and additionally sound-proof the same, and this layer may be applied either before pressing the anchor blocks into place (in which event it will extend under the same as shown) or afterwards.

Provision may advantageously be made for obtaining an insulating air space in the slab by inserting a continuous, sustained layer of any suitable material to bridge the air spaces desired, as does the material 25, in the slab-body of Fig. 1. It is also desirable to provide means for bonding the light weight plastic filling of the slab to the layer 50, thereof, and for additionally anchoring the blocks 53 in place. All of these objects are taken care of in this embodiment of my invention by stapling a layer of continuously backed metal mesh 57, such as the backed mesh 20—25 of Fig. 1, to the several blocks or strips 53, as shown. Preferably this backed mesh, as is the case in Fig. 1, comprises a bituminous waterproofing coating corresponding to the coating 24, Fig. 1, to serve the purpose served thereby, in connection with the air space 58.

The light plastic filling 59 may now be poured (either before or after insertion in place of the anchor blocks 60) and screeded off at the proper level for the slab thickness desired, the block-anchors 61 being embedded in the filling as shown to hold the blocks 60 in place, and upon sufficient setting of the slab, insulating layers 62 and interior finish 63 may be applied as in the embodiments above described.

If it is desired to cast together the exterior finish layer and the main-body of the slab shown in Fig. 3, this may be done by providing suitable anchors or anchor blocks and employing bridging means such as the members 20, 25 of Fig. 1 or the means 57 of Fig. 4, to bridge the insulating air spaces 13a, Fig. 3.

My invention has the advantage of permitting the use of sheet metal, cast metal, stone, or other slabs as surface finishes, preferably backed with a layer of moisture, heat and sound proofing material, and the finish may be either attached to the slab body by any suitable fastening means, such as screws secured to the anchor blocks 14, 15 or 16, or anchored in place by tying-in members during the casting of the slabs, as may be desired.

It should be clear to those skilled in the art from the foregoing description that my invention may be embodied in other specific forms than these herein disclosed to illustrate the same, and I therefore desire the described embodiments to be considered in all respects as illustrative and not restrictive.

I claim:

1. A preformed heat and sound proof reinforced slab construction comprising a body of light weight heat and sound proof set plastic material reinforced with metal mesh, and having insulating air spaces formed adjacent to and defined by portions of said metal mesh reinforcement.

2. A preformed heat and sound proof reinforced slab construction comprising a body of light weight heat and sound proof set plastic material reinforced with metal mesh, and having insulating air spaces formed adjacent to and defined by portions of said metal mesh reinforcement, said slab being provided with embedded anchoring means facilitating erection of the slab in a wall and attachment of surface finishes thereto.

3. A preformed heat and sound proof reinforced slab construction comprising a body of light weight heat and sound proof set plastic material reinforced with metal mesh, and having insulating air spaces formed adjacent to and defined by portions of said metal mesh reinforcement, said slab being provided with embedded anchoring means facilitating erection of the slab in a wall and attachment of surface finishes thereto, and said slab having reentrant portions at one of its faces to constitute further insulating air spaces when bridged by surface finishes attached thereto.

4. A light weight heat and sound proof building slab comprising a set body of light weight plastic material, bonded-in reinforcing means extending substantially the length and thickness of the body at spaced intervals therein, said body having insulating air spaces between said reinforcing means, and transverse reinforcement in said body between said reinforcing members whereby the reinforced body itself provides the strength and rigidity of the slab.

5. A light weight heat and sound proof building slab comprising a set body of light weight plastic material, bonded-in perforated metallic wall reinforcing means extending substantially the length and thickness of the body at spaced intervals therein, said body having transverse reinforcement between said reinforcing members whereby the reinforced body itself provides the strength and rigidity of the slab.

6. A light weight heat and sound proof building slab comprising a set body of light weight plastic material provided with reentrant portions on one of its flat sides and comprising reinforcing means extending substantially the thickness of the slab in the portions between said reentrant portions.

7. A light weight heat and sound proof building slab comprising a set body of light weight plastic material provided with reentrant portions on one of its flat sides and comprising reinforcing means extending substantially the thickness of the slab in the portions between said reentrant portions and insulating air spaces intermediate the thickness of said body in the spaces between said reinforcing means.

8. A light weight heat and sound proof building slab comprising a body of light weight plastic material provided with reentrant portions on one of its flat sides and comprising bonded-in longitudinal box-like reinforcing means extending substantially the thickness of the slab in the portions between said reentrant portions, and insulating air spaces intermediate the thickness of said body in the spaces between said box-like structures.

9. A light weight heat and sound proof building slab comprising a set body of light weight plastic material provided with reentrant portions on one of its flat sides and comprising bonded-in longitudinal box-like reinforcing means extending substantially the thickness of the slab in the portions between said reentrant portions, insulating air spaces intermediate the thickness of said body in the spaces between said box-like structure at least partially defined by continuously backed reinforcing mesh with its mesh side embedded in the set plastic.

10. A light weight heat and sound proof building slab comprising a set body of light weight plastic material provided with reentrant portions on one of its flat sides and comprising bonded-in longitudinal box-like reinforcing means extending substantially the thickness of the slab in the portions between said reentrant portions, insulating air spaces intermediate the thickness of said body in the spaces between said box-like structure at least partially defined by continuously backed reinforcing mesh with its mesh side embedded in the set plastic, said body including blocks within said box-like structure providing for the anchoring of fastenings to the slab through the walls of said box-like structure.

11. A light weight heat and sound proof composite building slab comprising an external weather proof reinforced layer of cementitious material, spaced anchor blocks adjacent the inner face of said layer and secured thereto, insulating air spaces between said anchor blocks, block-anchor means attached to said blocks, a filling of light weight heat and sound proof set plastic material embedding said block-anchor means and secured to said blocks thereby, and continuous layers of heat, sound and moisture proofing material between said surface material and said blocks, and on a surface of said set plastic filling, completely waterproofing said slab on both sides of said blocks.

12. A light weight heat and sound proof composite building slab comprising an external weather proof reinforced layer of cementitious material, spaced anchor-blocks adjacent to the inner face of said layer and secured thereto, insulating air spaces between said anchor-blocks, block-anchor means attached to said blocks, a filling of light weight heat and sound proof set plastic material embedding said block-anchor means, layers of heat, sound and moisture proofing material between said surface material and said blocks and on a surface of said set plastic filling, and an interior finish carried by said set plastic filling.

13. A light weight heat and sound proof building slab according to claim 5, said slab having insulating air spaces formed adjacent to and defined by portions of said transverse reinforcement.

14. A light weight heat and sound proof building slab according to claim 5, said transverse reinforcement being planar in form with turned-down edge-sections adjacent the first named reinforcing means.

15. A light weight heat and sound proof building slab according to claim 5, said transverse reinforcement being planar in form with turned-down edge-sections adjacent the first named reinforcing means, and said slab having insulating air spaces formed adjacent to said transverse reinforcement between the turned-down edge-sections thereof and of substantially the depth of said turned-down edge-sections.

16. A light weight heat and sound proof building slab according to claim 5, said slab having insulating air spaces formed adjacent to and defined by portions of said transverse reinforcement, said insulating air spaces being lined to render them waterproof and additionally heat and sound insulating.

THOMAS J. FOSTER.